United States Patent
Vilajosana et al.

(10) Patent No.: US 10,639,848 B2
(45) Date of Patent: May 5, 2020

(54) TEMPERATURE DETERMINATION IN ADDITIVE MANUFACTURING SYSTEMS

(71) Applicants: HEWLETT-PACKARD DEVELOPMENT COMPANY, L.P., Houston, TX (US); Xavier Vilajosana, Sant Cugat del Valles (ES); Sebastia Cortes, Barcelona (ES); Yngvar Rossow, Sant Cugat del Valles (ES)

(72) Inventors: Xavier Vilajosana, Sant Cugat del Valles (ES); Sebastia Cortes, Barcelona (ES); Yngvar Rossow, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/568,405

(22) PCT Filed: Sep. 28, 2015

(86) PCT No.: PCT/EP2015/072289
§ 371 (c)(1),
(2) Date: Oct. 20, 2017

(87) PCT Pub. No.: WO2017/054842
PCT Pub. Date: Apr. 6, 2017

(65) Prior Publication Data
US 2018/0186079 A1    Jul. 5, 2018

(51) Int. Cl.
*B29C 64/393*    (2017.01)
*B29C 64/165*    (2017.01)
(Continued)

(52) U.S. Cl.
CPC .......... *B29C 64/393* (2017.08); *B29C 64/165* (2017.08); *B29C 64/386* (2017.08);
(Continued)

(58) Field of Classification Search
CPC .... B23C 64/386; B23C 64/165; B23C 64/393
(Continued)

(56) References Cited

U.S. PATENT DOCUMENTS 5,319,426 A    6/1994 Baruch et al.
6,153,142 A    11/2000 Chari et al.
(Continued)

FOREIGN PATENT DOCUMENTS

JP    2016522312    7/2016
JP    2016540109    12/2016
(Continued)

OTHER PUBLICATIONS

Krauss et al., Thermographic Process Monitoring in Powderbed Based Additive Manufacturing (2015), AIP Conference Proceedings 1650, 177; Apr. 2, 2015 (Year: 2015).*

(Continued)

*Primary Examiner* — Mohammad Ali
*Assistant Examiner* — Joshua T Sanders
(74) *Attorney, Agent, or Firm* — HP Inc. Patent Department

(57) ABSTRACT

A method of controlling a heating sub-system in an additive manufacturing system. The method comprising receiving thermal imaging information from a temperature sensing subsystem, receiving additive manufacturing media concentration information from an additive manufacturing media concentration information database, on the basis of the received thermal imaging information and additive manufacturing media concentration information, for each pixel area in the plurality of pixel areas, determining the temperature for each additive manufacturing media agent in the plurality of additive manufacturing media agents which is present in the respective pixel area, and on the basis of the determined temperatures for each pixel area and additive (Continued)

manufacturing media agent, controlling the power to a heating subsystem employed in the given additive manufacturing process.

20 Claims, 6 Drawing Sheets

(51) Int. Cl.
  *B29C 64/386* (2017.01)
  *B33Y 10/00* (2015.01)
  *B33Y 30/00* (2015.01)
  *B33Y 50/02* (2015.01)

(52) U.S. Cl.
  CPC .............. *B33Y 10/00* (2014.12); *B33Y 30/00* (2014.12); *B33Y 50/02* (2014.12)

(58) Field of Classification Search
  USPC ........................................................ 700/119
  See application file for complete search history.

(56) References Cited

U.S. PATENT DOCUMENTS

| | | | |
|---|---|---|---|
| 7,680,424 | B2 | 3/2010 | Hurst et al. |
| 8,273,834 | B2 | 9/2012 | Markel et al. |
| 2004/0094058 | A1* | 5/2004 | Kasperchik ............ C04B 35/624 |
| | | | 101/483 |
| 2012/0024174 | A1* | 2/2012 | Sakash ...................... B41F 7/04 |
| | | | 101/248 |
| 2013/0123988 | A1* | 5/2013 | Jariwala ................. G05B 11/01 |
| | | | 700/266 |
| 2015/0061195 | A1 | 3/2015 | DeFelice et al. |
| 2015/0184005 | A1* | 7/2015 | Howald ............... C09D 11/101 |
| | | | 252/500 |
| 2016/0236279 | A1* | 8/2016 | Ashton ................. B22F 3/1055 |
| 2016/0368055 | A1* | 12/2016 | Swaminathan ....... B22F 3/1055 |

FOREIGN PATENT DOCUMENTS

| | | |
|---|---|---|
| WO | WO2012/009630 Y | 1/2012 |
| WO | WO2015/012837 A | 1/2015 |
| WO | WO2015/040433 Y | 3/2015 |
| WO | WO2015/106836 A | 7/2015 |
| WO | WO2015/108547 A | 7/2015 |

OTHER PUBLICATIONS

Wegner; "Process Monitoring in Laser Sintering Using Thermal Imaging"; Aug. 17, 2011; http://sffsymposium.engr.utexas.edu/Manuscripts/2011/2011-30-Wegner.pdf.

* cited by examiner

| P=80% | P=40% | P=70% | P=80% |
| A=20% | A=40% | A=30% | A=20% |
| D=0% | D=20% | D=0% | D=0% |
| P=80% | P=0% | P=0% | P=80% |
| A=20% | A=100% | A=100% | A=20% |
| D=0% | D=0% | D=0% | D=0% |
| ... | ... | ... | ... |

*Fig. 4*

| Detailing | 0% | 5% | 10% | 15% | 20% | ... | 100% |
|---|---|---|---|---|---|---|---|
| <25C | 0 | -0,2 | -0.5 | -0.7 | -1.0 | | -5.0 |
| ... | | | | | | | |
| 190C | 0 | -0.6 | -1.4 | -1.7 | -2.0 | | -7.8 |
| >195C | 0 | -0.65 | -1.45 | -1.75 | -2.1 | | -8.0 |

*Fig. 5*

TEMPERATURE DETERMINATION IN ADDITIVE MANUFACTURING SYSTEMS

BACKGROUND

Additive manufacturing systems that generate three-dimensional objects, including those commonly referred to as "3D printers", have been proposed as a potentially convenient way to produce three-dimensional objects. These systems may receive a definition of the three-dimensional object in the form of an object model. This object model is processed to instruct the system to produce the object using one or more material components. This may be performed on a layer-by-layer basis. The processing of the object model may vary based on the type of system and/or the production technology being implemented.

BRIEF DESCRIPTION OF THE DRAWINGS

Various features of the present disclosure will be apparent from the detailed description which follows, taken in conjunction with the accompanying drawings, which together illustrate certain example features, and wherein:

FIG. 4 shows a table giving the concentration of agents as given by the pipeline to a temperature control subsystem according to certain examples;

FIG. 5 depicts a lookup table for the detailing agent according to an example;

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
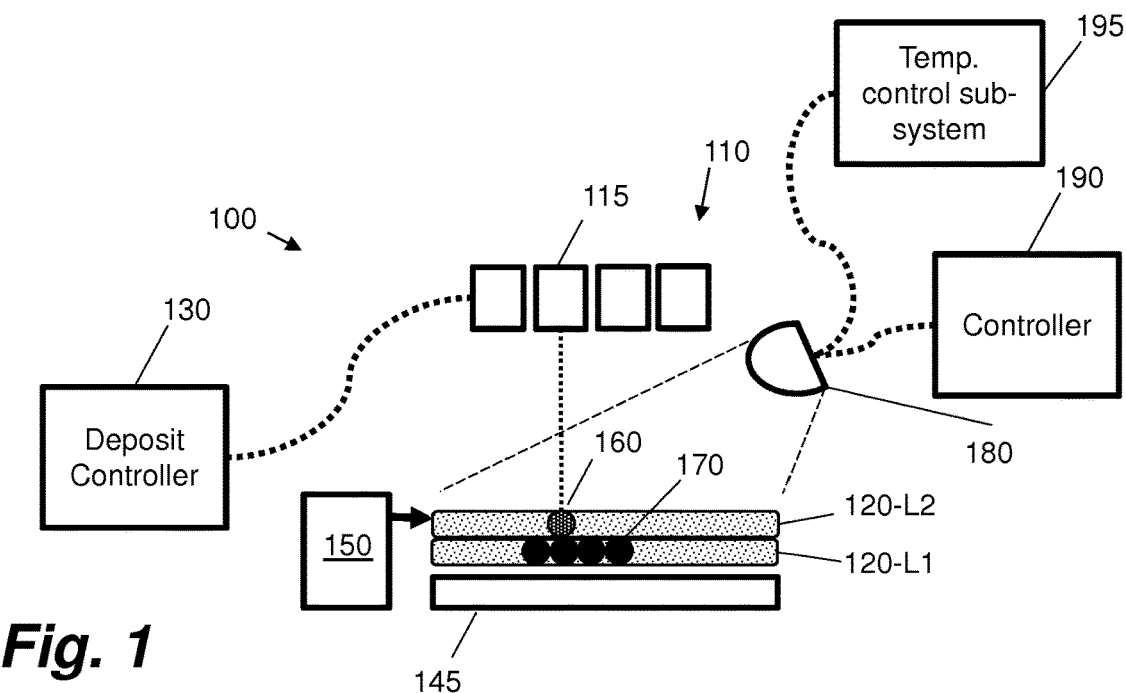
FIG. 1 is a schematic diagram showing components of an additive manufacturing system according to an example.

FIG. 1 shows an example 100 of an additive manufacturing system that uses an inkjet deposit mechanism 110 to print a plurality of liquid agents onto layers of a powdered (or slurry, paste, gel, etc.) substrate. Although the examples described herein may be applied to different types of additive manufacturing system, the example 100 of FIG. 1 will be used for ease of reference to further explain some of the concepts disclosed herein. Other examples may be applied to one or more of selective laser sintering systems, stereo lithography systems, inkjet systems, fused deposition modelling systems, any three-dimensional printing system, inkjet deposition systems, and laminated object manufacturing systems.

In FIG. 1, the inkjet deposit or print mechanism 110 implements a deposit mechanism. The deposit mechanism 110 in this example comprises four inkjet printheads 115. Each inkjet printhead is adapted to deposit an agent onto a powdered polymer substrate 120. In particular, each inkjet printhead is arranged to deposit a particular agent upon defined areas within a plurality of successive substrate layers. An agent may for example act as a coalescing agent (e.g. a binder) or as a coalescing modifier. In FIG. 1, the inkjet print mechanism 110 is communicatively coupled to a deposit controller 130. Further components, may be present but are not shown for clarity.

In FIG. 1, the additive manufacturing system comprises a substrate supply mechanism 150 to supply at least one substrate layer upon which the plurality of materials are deposited by the deposit mechanism 110. In this example, the substrate supply mechanism 150 comprises a powdered substrate supply mechanism to supply successive layers of substrate. Two layers are shown in FIG. 1: a first layer 120-L1 upon which a second layer 120-L2 has been deposited by the substrate supply mechanism 150. In certain cases, the substrate supply mechanism 150 is arranged to move relative to the platen 145 such that successive layers are deposited on top of each other.

In the present example, the additive manufacturing system also comprises a fixing system 180 (or 'heating subsystem') arranged to apply energy to form portions of the three-dimensional object from combinations of the agents and the powdered substrate. For example, FIG. 1 shows a particular printhead 115 depositing a controlled amount of a fluid agent onto an addressable area of the second layer 120-L2 of powdered substrate. The fluid agent is absorbed by the powdered substrate and as such a drop of agent on an addressable area unit of the layer relates to a print resolution volumetric pixel (voxel) 160. Following application of the agent the fixing system 180 is arranged to fix or solidify the portion of the layer 160. In some examples, the fixing system 180 may apply energy uniformly to the whole layer. In some examples, portions of powder and coalescing agent may coalesce and solidify, whereas portions of powder alone (or powder and detailing agent) may not coalesce and solidify. In some examples, detailing agents may allow the properties of portions of powder to be modified (e.g. to have different properties depending on the nature of the agent).

In some examples, fixing system 180 comprises an energy source such as one or more ultra-violet or infra-red light sources, e.g. fusing lamps or lasers. In some examples, fixing system 180 comprises a controller 190 for controlling the fusing process, including controlling the power applied by a fusing energy source such as one or more fusing lamps or lasers. FIG. 1 shows four print resolution voxels 170 that have been fixed in the first layer 120-L1. As such, voxel 160 may be built on these previous voxels 170 to build a three-dimensional object. Lower layers of substrate may also provide support for overhanging fixed portions of a three-dimensional object, wherein at the end of production any unsolidified substrate is removed to reveal the completed object.

Figure 2:
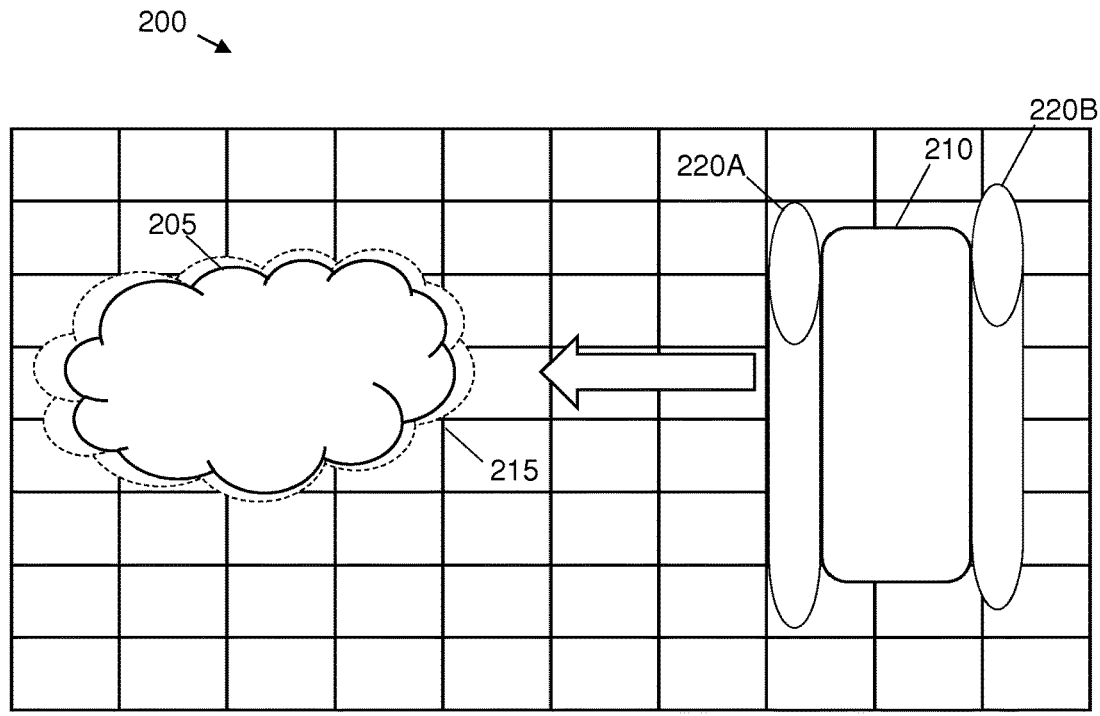
FIG. 2 is a schematic illustration of a print bed area with an object printed with fusing agent (solid shape 205) and surrounded by detailing agent (dashed shape 215) according to an example.

FIG. 2 is a schematic illustration of a print-bed area 200 with an object printed with fusing agent 205 and surrounded by a agent 215. A fusing energy source (in this example fusing lamps 220A and 220B) is for example moved either along a scan axis or along a re-coater axis. In this example, fusing lamps 220A and 220B are attached to print carriage 210.

Improved performance in additive manufacturing systems can be achieved with process repeatability and consistency which are related to the ability to control the stability and homogeneity of the temperature distribution precisely over the printing area within a very narrow range (±1° C.). In certain examples, this involves adapting the heat distribution and temperature measurement dynamically to react quickly to changing surface heat distributions. Moreover, in certain examples, a fine grained temporal temperature control is provided which enables selective energy provision to the heating subsystem so material phase changes are carried out at the desired moment and with the optimal amount of energy without jeopardizing material selectivity.

In certain examples, to ensure proper material phase transitions at the desired moments, a temperature control subsystem 195 is enabled to accurately measure the temperature of the powder (also commonly referred to as 'white') and the temperature of the fusing agent or printed parts covered area (also commonly referred to as 'dark'). Due to its color difference, thermal properties, enthalpy and to different radiation patterns, the temperature measurements in a surface might have differences.

Certain examples involve determining precisely the temperature of both the powder covered area (white) and the different agents on the bed (e.g., fusing agent or printed part covered area (dark or color), detailing agent, etc . . . ). In certain examples, this is achieved using the information that is available at each moment (or 'stage') of the printing process, which is the current layer being printed (e.g. concentration of agents per pixels), the information from layers underneath and the temperature map (for example as a set of pixels). Certain examples described herein comprise mechanisms by which the temperature of powder covered areas, fusing agent covered areas and/or detailing agent covered areas temperature can be accurately determined.

Certain examples described herein ensure that thermal imaging of the printbed is able to determine exactly the temperature of the different agents being printed on the bed, taking into account their concentration. Certain examples enable determination of the exact temperature of the powder or infer it given the temperature of a certain area with a known agent concentration. One or more issues addressed by certain examples are of the utmost importance as agent temperatures are used to control the fusing process whilst powder temperature is used to ensure the stability of the process.

Known Selective Laser Sintering (SLS) printers make use of different printbed patches and single point infrared (IR) sensors to determine the temperature of both areas. Issues of such known systems include firstly that they jeopardize the space in the printbed and secondly that they become less accurate as the temperature reference is taken in a single point. Distant areas might have slight temperature differences which make the single point temperature sensing inaccurate.

In certain examples, the lamp control subsystem is programed to achieve a targeted stable and homogeneous temperature all over the printing bed. In certain examples, this is done by controlling the amount of energy provided to a set of lamps that heat the printing surface. In certain examples, a set of temperature sensors (IR sensors, thermal cameras, etc . . . ) are used to read the current surface temperature. In some examples, multiple sensors, thermal cameras, etc . . . are used, each one monitoring an approximately non-overlapping area on the printing bed. In some examples, a temperature map is built using input from one or more sensors and used to feed the lamp control loop to achieve a target temperature according to the printing phase (e.g. melting of the absorber material agent covered area, preheating, post-heating etc.).

Figure 3:
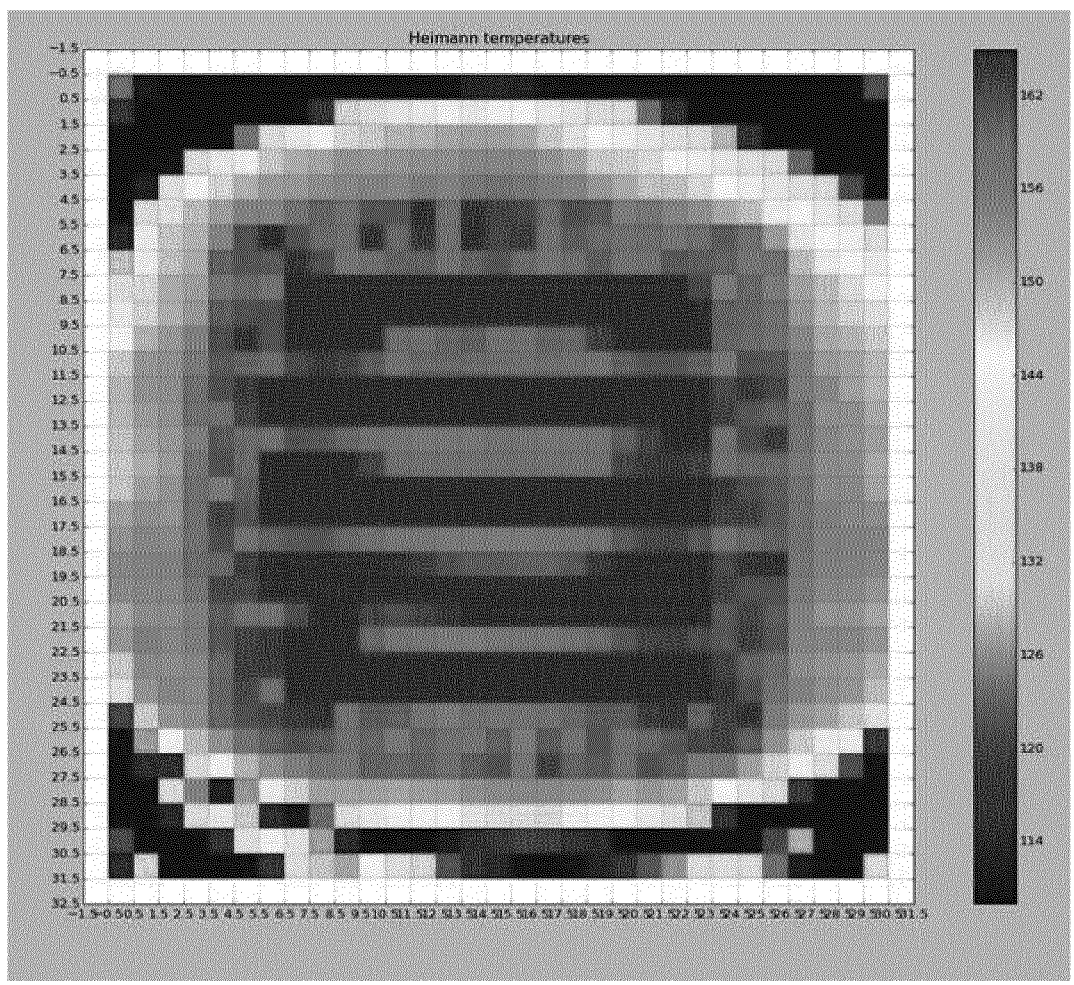
FIG. 3 is an illustration of a thermal image of a printbed while printing according to certain examples.

FIG. 3 is an illustration of a thermal image of a printbed while printing according to certain examples. In FIG. 3, the darker red areas towards the middle of the image show the areas with absorber agent.

According to certain examples, agents temperature is inferred by the following:

At the beginning of printing a layer, an agent concentration map is received. This map is a representation of the percentage of each agent at each of the areas that represent a pixel from the thermal camera (for example approximately areas of 10 square millimeters). Thus, the map indicates how much absorber agent, detailing agent and white (or color) powder (in percentages) that there is at each pixel as perceived by the thermal camera. Note that this can be applied to as many agents as the printer can handle, including for example color, etc.

FIG. 4 shows a table giving the concentration of agents as given by the pipeline to the temperature control subsystem according to certain examples. In FIG. 4, P stands for non-agent covered part of the pixel, A stands for absorber agent and D for detailing agent respectively.

In certain examples, the thermal camera pixel map is obtained several times successively during the layer formation. From the temperature matrix and the agents' concentration map, the temperature of the different agents at each pixel is obtained according to certain examples.

In certain examples, a challenge is to be able to infer the exact temperature of the different materials in a pixel knowing it has for example 40% of absorber agent and 10% of detailing agent (the rest being just powder). It should be noted that in certain examples the sensor is giving the average temperature of the square area so this is hiding the real temperatures of the different materials which it is desired to determine. Therefore, in certain examples a set of 1 or more lookup tables is employed. In certain examples, the information in the lookup tables is predetermined in a laboratory and programed at the printing machines; the information can be configured as one or more media settings (for example it may depend on the material) according to certain examples.

FIG. 5 depicts a lookup table for the detailing agent according to an example. In certain examples, absorber and other agents have their own lookup tables. The example lookup table of FIG. 5 can be used to infer the temperature of the detailing agent according to its concentration in a particular area and given the temperature information from the thermal camera.

In certain examples, a lookup table is used to determine the temperature of the agent according to the read temperature. For example, if the sensor reads 190 C for a particular pixel with a concentration of detailing agent for that pixel of 20%, then the real temperature of the detailing agent can be calculated as 190 C-2.0 C=188 C.

According to certain examples, the one or more lookup tables are obtained at the lab and stored as media settings. To obtain the tables, a pattern plot is printed on the bed with different agent concentrations (5, 10, 15% etc . . . ) and the bed heated to the maximum allowed temperature according to certain examples. In certain examples, the temperature is recorded for several table entries and the rest of the values can be determined for example through a linear regression.

Once the heating system is able to determine the temperatures of the different agents according to examples, this information can be used during the printing of a layer to optimize the melting and heating processes.

For example, during the printing of a layer, each individual control zone uses a source of temperature (the temperature of the absorber agent, the temperature of the detailing agent, etc.) according to the objective (melt absorber agent covered part, or keep the powder temperature at target). In certain examples, the controller delivering power to the lamps uses the corresponding temperature information to determine the power to be applied. When the controller aims to melt the absorber material covered area according to certain examples, the controller uses those pixels in which A>0% and corrects the temperature obtained from the thermal camera using the corresponding media setting lookup table as for example presented in FIG. 5.

Figure 6:
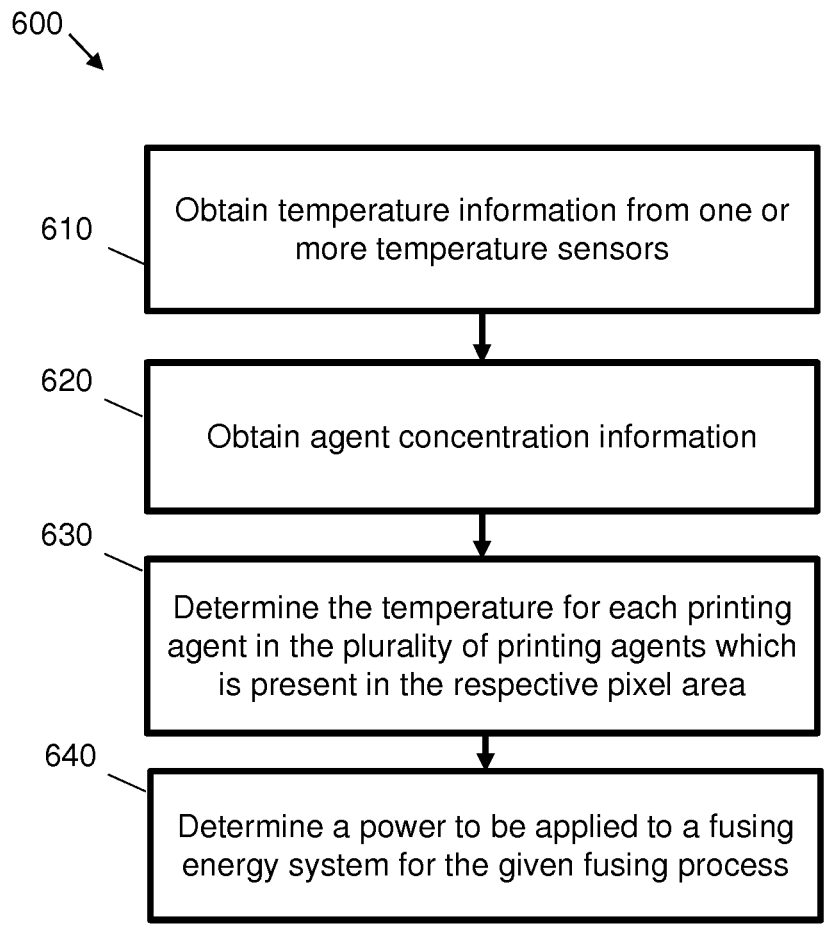
FIG. 6 is a flowchart showing operations performed by a controller in an additive manufacturing system according to an example.

FIG. 6 is a flowchart showing operations performed by a controller 190 in an additive manufacturing system according to an example.

At block 610, temperature information is obtained from one or more temperature sensors. Each of the one or more temperature sensors is configured to measure the temperature of a respective pixel area in a plurality of pixel areas in a print-bed area for at least one layer of a part being printed in a given three-dimensional printing process.

At block 620, agent concentration information is obtained. The received agent concentration information comprises, for each pixel area in the plurality of pixel areas, a concentration of each of a plurality of printing agents present in the respective pixel area.

At block 630, the temperature for each printing agent in the plurality of printing agents which is present in the respective pixel area is determined for each pixel area in the plurality of pixel areas on the basis of the obtained temperature information and agent concentration information.

At block 640, a power to be applied to a heating subsystem employed in the given three-dimensional printing process is determined on the basis of the determined temperatures for each pixel area and printing agent.

In certain examples, further temperature information from the one or more temperature sensors is obtained. In these examples, the obtained further temperature information comprises measured temperatures of pixel areas in the plurality of pixel areas for a subsequent stage of the given three-dimensional printing process. In these examples, the temperature for each printing agent in the plurality of printing agents which is present in the respective pixel area is further determined for each pixel area in the plurality of pixel areas on the basis of the obtained further temperature information and agent concentration information. The power control to the heating subsystem employed in the subsequent stage of the given three-dimensional printing process is dynamically updated on the basis of the further determined temperatures for each pixel area and printing agent.

In certain examples, the one or more temperature sensors comprise a plurality of temperature sensors.

According to certain examples, the controller is configured to perform a lookup in a plurality of predetermined temperature adjustment data lookup tables, each lookup table in the plurality of predetermined temperature adjustment data lookup tables comprising predetermined temperature adjustment data for a set of different measured temperatures and different printing agent concentrations for a given printing agent in the plurality of printing agents. In these examples, the power to be applied to the heating subsystem employed in the given three-dimensional printing process is further determined on the basis of the results of the performed lookup.

In certain examples, controlling the power to the heating subsystem comprises determining a power to apply to each of a plurality of fusing lamps.

In certain examples, the plurality of printing agents comprises two or more of powder agent, fusing agent, and detailing agent.

In some examples, the obtained temperature information comprises thermal imaging information from a plurality of thermal cameras.

According to certain examples, the controller is configured to transmit a control signal representative of the determined power to the heating subsystem employed in the given three-dimensional printing process.

Figure 7:
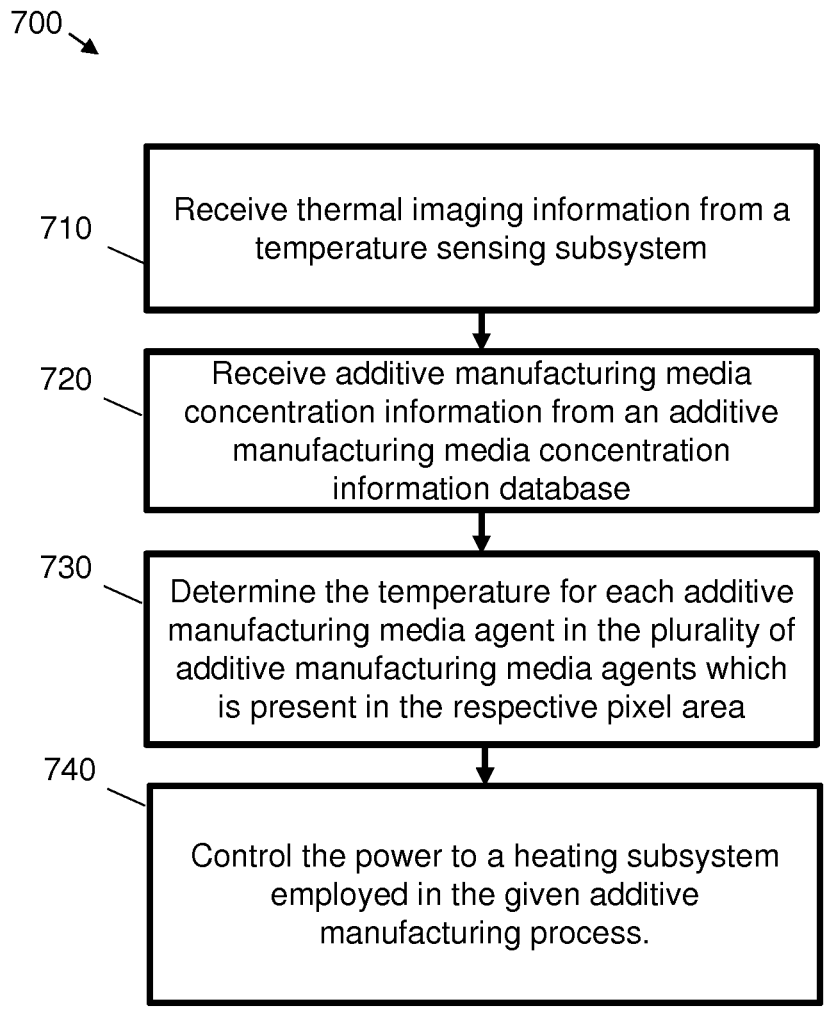
FIG. 7 is a flowchart showing a method 700 of controlling a heating sub-system in an additive manufacturing system.

FIG. 7 is a flowchart showing a method 700 of controlling a heating sub-system in an additive manufacturing system.

At block 710, thermal imaging information is received from a temperature sensing subsystem. The temperature sensing subsystem comprises one or more thermal cameras configured to measure the temperature of a respective pixel area in a plurality of pixel areas in a print-bed area in a given additive manufacturing process.

At block 720, additive manufacturing media concentration information is received from an additive manufacturing media concentration information database. The received additive manufacturing media concentration information comprises, for each pixel area in the plurality of pixel areas, a concentration of each of a plurality of additive manufacturing media present in the respective pixel area.

At block 730, the temperature for each additive manufacturing media agent in the plurality of additive manufacturing media agents which is present in the respective pixel area is determined for each pixel area in the plurality of pixel areas on the basis of the received thermal imaging information and additive manufacturing media concentration information.

At block 740, the power to a heating subsystem employed in the given additive manufacturing process is controlled on the basis of the determined temperatures for each pixel area and additive manufacturing media agent.

According to certain examples, further thermal imaging information is received from the temperature sensing subsystem. In these examples, the temperature sensing subsystem comprises one or more thermal cameras configured to measure the temperature of a respective pixel area in a plurality of pixel areas in a print-bed area for a subsequent stage of the given additive manufacturing process. In these examples, the temperature for each additive manufacturing media in the plurality of additive manufacturing media which is present in the respective pixel area is further determined for each pixel area in the plurality of pixel areas on the basis of the received further thermal imaging information and additive manufacturing media concentration information. In these examples, the power control to the heating subsystem employed in the subsequent stage of the given additive manufacturing process is dynamically updated on the basis of the further determined temperatures for each pixel area and additive manufacturing media.

In certain examples, the one or more thermal cameras comprise a plurality of thermal cameras.

Certain examples comprise obtaining, from one or more predetermined temperature adjustment data lookup tables, predetermined temperature adjustment data for a plurality of different measured temperatures and different additive manufacturing media concentrations for each of the additive manufacturing media in the plurality of additive manufacturing media. In such examples, the power to the heating subsystem employed in the given additive manufacturing process is further controlled on the basis of the obtained predetermined temperature adjustment data.

In certain examples, the one or more predetermined temperature adjustment data lookup tables are stored as media settings in the additive manufacturing system.

In some examples, controlling the power to the heating subsystem comprises controlling a power to apply to each of a plurality of fusing lamps.

In some examples, controlling the power to the heating subsystem comprises transmitting one or more control signals to the heating subsystem.

In certain examples, the plurality of additive manufacturing media comprises two or more of powder media, fusing media, and detailing media.

Figure 8:
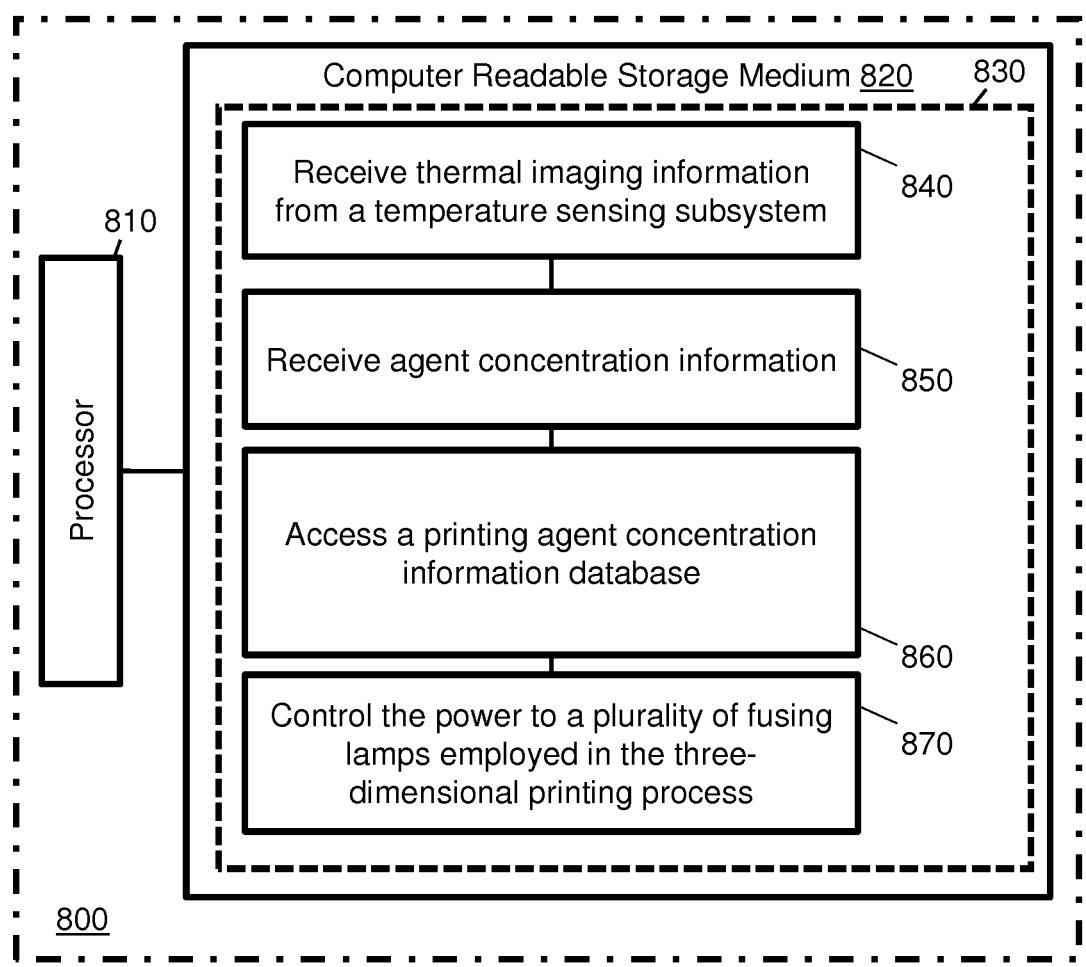
FIG. 8 is a schematic illustration of a processing device according to an example.

Certain system components and methods described herein may be implemented by way of machine readable instructions that are storable on a non-transitory storage medium. FIG. 8 shows an example of a three-dimensional printing system or device 800 comprising at least one processor 810 arranged to retrieve data from a computer-readable storage medium 820. The computer-readable storage medium 820 comprises a set of computer-readable instructions 830 stored thereon. The at least one processor 810 is configured to load the instructions 830 into memory for processing. The instructions 830 are arranged to cause the at least one processor 810 to perform a series of actions.

Instruction 840 is configured to cause the processor 810 to receive thermal imaging information from a temperature sensing subsystem. The temperature sensing subsystem comprises a plurality of thermal cameras configured to measure the temperature of a respective pixel area in a plurality of pixel areas in a print-bed area in a given three-dimensional printing process.

Instruction 850 is configured to cause the processor 810 to receive agent concentration information. The received agent concentration information comprises, for each pixel area in the plurality of pixel areas, a concentration of each of a plurality of printing agents present in the respective pixel area.

Instruction 860 is configured to cause the processor 810 to access a printing agent concentration information database. The printing agent concentration information database comprises a plurality of temperature correction lookup tables. Each lookup table in the plurality of temperature correction lookup tables comprises temperature correction data for a plurality of different measured temperatures and different printing agent concentrations. The accessing results in, for each pixel area in the plurality of pixel areas, corrected temperatures for each printing agent in the plurality of printing agents which is present in the respective pixel area.

Instruction 870 is configured to cause the processor 810 to control the power to a plurality of fusing lamps employed in the three-dimensional printing process on the basis of the corrected temperatures for each pixel area and printing agent.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

Certain examples improve additive manufacturing processes such as fusion sintering by accurately sensing temperatures all over the printbed and particular to each area.

Certain examples enable very precise control of the temperature sensing subsystem and therefore improve heating subsystem operation and energy delivery.

Certain examples improve overall printing processes as precise temperature determination favours parts quality and mechanical properties.

The preceding description has been presented to illustrate and describe examples of the principles described. This description is not intended to be exhaustive or to limit these principles to any precise form disclosed. Many modifications and variations are possible in light of the above teaching.

The invention claimed is:

1. An additive manufacturing system, the system comprising a controller configured to:
   operate a fluid dispenser to selectively dispense at least one of a plurality of print agents to a print-bed area containing a layer of a part being printed in a given three-dimensional printing process;
   obtain temperature information from one or more temperature sensors, wherein each of the one or more temperature sensors is configured to measure a temperature of a respective pixel area in a plurality of pixel areas in the print-bed area for at least one layer of the part being printed;
   obtain agent concentration information, the received agent concentration information comprising, for each pixel area in the plurality of pixel areas, a concentration of each of the plurality of printing agents present in the respective pixel area;
   on the basis of the obtained temperature information and agent concentration information, for each pixel area in the plurality of pixel areas, determine the temperature for each printing agent in the plurality of printing agents which is present in the respective pixel area, the different printing agents having different respective temperatures within that pixel area; and
   on the basis of the determined temperatures for each pixel area and printing agent, determine a power to be applied to a heating subsystem employed in the given three-dimensional printing process.

2. The system of claim 1, the controller being configured to:
   obtain further temperature information from the one or more temperature sensors, the obtained further temperature information comprising measured temperatures of pixel areas in the plurality of pixel areas for a subsequent stage of the given three-dimensional printing process;
   on the basis of the obtained further temperature information and agent concentration information, for each pixel area in the plurality of pixel areas, further determine the temperature for each printing agent in the plurality of printing agents which is present in the respective pixel area; and
   on the basis of the further determined temperatures for each pixel area and printing agent, dynamically update the power control to the heating subsystem employed in the subsequent stage of the given three-dimensional printing process.

3. The system of claim 1, the controller being configured to:
   perform a lookup in a plurality of predetermined temperature adjustment data lookup tables, each lookup table in the plurality of predetermined temperature adjustment data lookup tables comprising predetermined temperature adjustment data for a set of different measured temperatures and different printing agent concentrations for a given printing agent in the plurality of printing agents, wherein the power to be applied to the heating subsystem employed in the given three-dimensional printing process is further determined on the basis of the results of the performed lookup.

4. The system of claim 1, wherein controlling the power to the heating subsystem comprises determining a power to apply to each of a plurality of fusing lamps.

5. The system of claim 1, wherein the plurality of printing agents comprises two or more of:
powder agent,
a liquid fusing agent, and
a liquid detailing agent.

6. The system of claim 1, wherein the obtained temperature information comprises thermal imaging information from a plurality of thermal cameras.

7. The system of claim 1, wherein the controller is configured to transmit a control signal representative of the determined power to the heating subsystem employed in the given three-dimensional printing process.

8. The system of claim 1, further comprising:
a substrate supply mechanism to spread a layer of powder; and
a liquid ejection device to selective eject at least one of the plurality of printing agents into each layer of powder.

9. The system of claim 1, the controller to determine the power to be applied by the heating subsystem to each pixel area based on a current objective at that pixel area and temperature of a corresponding material in that pixel area.

10. The system of claim 9, wherein the current objective for a first pixel area is to melt material covered by an absorber agent, the controller to determine the power to be applied based on temperature of the absorber agent.

11. The system of claim 9, wherein the current objective for a first pixel area is to keep powder at a target temperature, the controller to determine the power to be applied based on determined temperature of the powder, the temperature of the powder determined based on both measured temperature of that pixel area and printing agent concentration information for that pixel area.

12. A method of controlling a heating sub-system in an additive manufacturing system, the method comprising:
operating a fluid dispenser to selectively dispense at least one of a plurality of additive manufacturing media agents to a bed area containing a layer of a part being printed in a given additive manufacturing process;
receiving thermal imaging information from a temperature sensing subsystem, the temperature sensing subsystem comprising one or more thermal cameras configured to measure the temperature of a respective pixel area in a plurality of pixel areas in the bed area;
receiving additive manufacturing media agent concentration information from an additive manufacturing media agent concentration information database, the received additive manufacturing media agent concentration information comprising, for each pixel area in the plurality of pixel areas, a concentration of each of the plurality of additive manufacturing media agents present in the respective pixel area;
on the basis of the received thermal imaging information and additive manufacturing media agent concentration information, for each pixel area in the plurality of pixel areas, determining a different respective temperature for each additive manufacturing media agent in the plurality of additive manufacturing media agents which is present in the respective pixel area; and
on the basis of the determined temperatures for each pixel area and additive manufacturing media agent, controlling the power to a heating subsystem employed in the given additive manufacturing process.

13. The method of claim 12, comprising:
receiving further thermal imaging information from the temperature sensing subsystem, the temperature sensing subsystem comprising one or more thermal cameras configured to measure the temperature of a respective pixel area in a plurality of pixel areas in the bed area for a subsequent stage of the given additive manufacturing process;
on the basis of the received further thermal imaging information and additive manufacturing media agent concentration information, for each pixel area in the plurality of pixel areas, further determining the temperature for each additive manufacturing media agent in the plurality of additive manufacturing media agents which is present in the respective pixel area; and
on the basis of the further determined temperatures for each pixel area and additive manufacturing media agent, dynamically updating the power control to the heating subsystem employed in the subsequent stage of the given additive manufacturing process.

14. The method of claim 12, comprising obtaining, from one or more predetermined temperature adjustment data lookup tables, predetermined temperature adjustment data for a plurality of different measured temperatures and different additive manufacturing media agent concentrations for each of the additive manufacturing media agents in the plurality of additive manufacturing media agents,
wherein the power to the heating subsystem employed in the given additive manufacturing process is further controlled on the basis of the obtained predetermined temperature adjustment data.

15. The method of claim 14, wherein the one or more predetermined temperature adjustment data lookup tables are stored as media settings in the additive manufacturing system.

16. The method of claim 12, wherein controlling the power to the heating subsystem comprises controlling a power to apply to each of a plurality of fusing lamps.

17. The method of claim 12, wherein controlling the power to the heating subsystem comprises transmitting one or more control signals to the heating subsystem.

18. The method of claim 12, wherein the plurality of additive manufacturing media comprises
liquid fusing media, and
liquid detailing media.

19. The method of claim 12, further comprising determining the power of the heating subsystem for each pixel area based on a current objective at that pixel area and temperature of a corresponding material in that pixel area,
wherein, when the current objective for that pixel area is to melt material covered by an absorber agent, the method determining the power of the heating subsystem for that pixel area based on temperature of the absorber agent; and
wherein, when the current objective for that pixel area is to keep powder at a target temperature, the method determining the power of the heating subsystem for that pixel area based on determined temperature of the powder, the temperature of the powder determined based on both measured temperature of that pixel area and printing agent concentration information for that pixel area.

20. A non-transitory computer-readable storage medium storing instructions that, if executed by a processor of a three-dimensional printing system, cause the processor to:
   operate a fluid dispenser to selectively dispense at least one of a plurality of print agents to a print-bed area containing a layer of a part being formed in a given three-dimensional printing process;
   receive thermal imaging information from a temperature sensing subsystem, the temperature sensing subsystem comprising a plurality of thermal cameras configured to measure a temperature of a respective pixel area in a plurality of pixel areas in the print-bed area;
   receive agent concentration information, the received agent concentration information comprising, for each pixel area in the plurality of pixel areas, a concentration of each of a plurality of printing agents present in the respective pixel area;
   access a printing agent concentration information database, the printing agent concentration information database comprising a plurality of temperature correction lookup tables, each lookup table in the plurality of temperature correction lookup tables comprising temperature correction data for a plurality of different measured temperatures and different printing agent concentrations, wherein the accessing results in, for each pixel area in the plurality of pixel areas, corrected temperatures for each printing agent in the plurality of printing agents which is present in the respective pixel area; and
   on the basis of the corrected temperatures for each pixel area and printing agent, control the power to a plurality of fusing lamps employed in the three-dimensional printing process.

* * * * *